US012681370B2

(12) United States Patent
Liao et al.

(10) Patent No.: US 12,681,370 B2
(45) Date of Patent: Jul. 14, 2026

(54) PROJECTION DEVICE

(71) Applicant: Coretronic Corporation, Hsin-Chu
(TW)

(72) Inventors: Chien-Chung Liao, Hsin-Chu (TW);
Chang-Yung Chen, Hsin-Chu (TW);
Chun-Hsien Wu, Hsin-Chu (TW)

(73) Assignee: Coretronic Corporation, Hsin-Chu
(TW)

( * ) Notice: Subject to any disclaimer, the term of this
patent is extended or adjusted under 35
U.S.C. 154(b) by 280 days.

(21) Appl. No.: 18/395,666

(22) Filed: Dec. 25, 2023

(65) Prior Publication Data

US 2024/0231202 A1 Jul. 11, 2024

(30) Foreign Application Priority Data

Jan. 9, 2023 (CN) ......................... 202310024384.X

(51) Int. Cl.
G03B 21/14 (2006.01)
F16B 2/02 (2006.01)
H01F 7/02 (2006.01)
(52) U.S. Cl.
CPC .............. G03B 21/145 (2013.01); F16B 2/02
(2013.01); H01F 7/0205 (2013.01); *F16B*
*2200/83* (2023.08)

(58) Field of Classification Search
None
See application file for complete search history.

(56) References Cited

U.S. PATENT DOCUMENTS

2012/0188034 A1* 7/2012 Ku ........................ G03B 21/145
335/219
2020/0186763 A1* 6/2020 Chen .................. H05K 7/20163

FOREIGN PATENT DOCUMENTS

| CN | 209265159 U | 8/2019 |
| TW | M261937 U | 4/2005 |
| TW | M472931 U | 2/2014 |
| TW | 201905937 A | 2/2019 |
| TW | M576413 U | 4/2019 |
| TW | I691779 B | 4/2020 |

* cited by examiner

*Primary Examiner* — Bao-Luan Q Le
*Assistant Examiner* — Danell L Owens

(57) ABSTRACT

A projection device provided includes a projector housing
and a protective sleeve. At least one magnetic element is
disposed on an outer surface of the projector housing. The
protective sleeve is adapted to cover the projector housing.
The protective sleeve includes a body and a magnetic
attraction module, and the magnetic attraction module is
disposed at a first end of the body. The protective sleeve has
the advantages of easy disassembly and assembly.

9 Claims, 6 Drawing Sheets

1

<u>1</u>

10

11

L

300

PROJECTION DEVICE

CROSS-REFERENCE TO RELATED APPLICATION

This application claims the priority benefit of China application (202310024384.X), filed on Jan. 9, 2023. The entirety of the above-mentioned patent application is hereby incorporated by reference herein and made a part of this specification.

FIELD OF THE INVENTION

The invention relates to a projection device, and more particularly to a projection device including a protective sleeve.

BACKGROUND OF THE INVENTION

In recent years, the projection device with light body and easy to carry is gradually popularized, and the technology of wireless connection to mobile phone or notebook computer makes the use of projection device more diversified. In order to prevent the projection device from being scratched or damaged due to collision in the process of carrying or moving, protective sleeves with various colors and patterns have been designed for the projection device. In addition to protecting the projection device, the protective sleeve can also make its appearance more beautiful and can be removed and replaced by users according to their personal preferences. However, the conventional protective sleeve of the projection device is not easy to assemble and disassemble and replace, which makes users easy to encounter difficulties in the process of disassembly and replacement.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a projection device whose protective sleeve is easy to assemble and disassemble.

Other advantages and objectives of the invention may be further illustrated by the technical features broadly embodied and described as follows.

In order to achieve one or a portion of or all of the objectives or other objectives, the projection device provided by the invention includes a projector housing and a protective sleeve. At least one magnetic element is disposed on an outer surface of the projector housing. The protective sleeve is adapted to cover the projector housing. The protective sleeve includes a body and a magnetic attraction module, and the magnetic attraction module is disposed at a first end of the body.

In an embodiment of the invention, the magnetic attraction module includes at least one magnetic attraction kit. The magnetic attraction kit includes a magnet and a magnetic conductive shell. The magnet has a magnetic attraction surface on a side of the magnet near the projector housing. The magnetic conductive shell has an open end surface and an accommodating groove that is recessed from the open end surface in a direction away from the projector housing. The magnet is disposed in the accommodating groove. The open end surface is parallel to the magnetic attraction surface. A first magnetic pole of the magnet is located on the magnetic attraction surface. The magnetic conductive shell guides a second magnetic pole of the magnet to the open end surface. The magnetic attraction surface and the open end surface are attached on the corresponding at least one magnetic element.

In an embodiment of the invention, a side wall of the magnetic conductive shell has at least one first fixing structure. The magnetic attraction module further includes at least one fixing part. An inner wall of the fixing part has at least one second fixing structure. The magnetic conductive shell is disposed at the corresponding fixing part. The first fixing structure is combined with the corresponding second fixing structure.

In an embodiment of the invention, the second fixing structure is clamped to the corresponding first fixing structure.

In an embodiment of the invention, the magnetic attraction module further includes a connecting part. The connecting part is connected to the body. The fixing part is disposed on the connecting part.

In an embodiment of the invention, the magnetic attraction module further includes at least one buffer. The buffer is disposed between the corresponding fixing part and the magnetic conductive housing.

In an embodiment of the invention, the magnetic attraction kit further includes a bonding part. The bonding part is disposed between the corresponding magnet and the magnetic conductive housing.

In an embodiment of the invention, the projector housing further includes a first positioning part. The body further includes a second positioning part. The second positioning part is disposed at a second end of the body. The second end of the body is opposite to the first end. The first positioning part is combined with the second positioning part.

In an embodiment of the invention, the first positioning part includes a plurality of positioning holes. The second positioning part includes a plurality of positioning columns. The positioning holes are sleeved on the positioning columns respectively.

In an embodiment of the invention, the body further includes at least one opening. The opening is disposed at a second end of the body. The second end of the body is opposite to the first end. The opening exposes the corresponding magnetic element.

The invention adopts the magnetic element disposed on the outer surface of the projector housing to attract the magnetic attraction kit on the protective sleeve, which makes the protective sleeve easy to assemble and disassemble.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
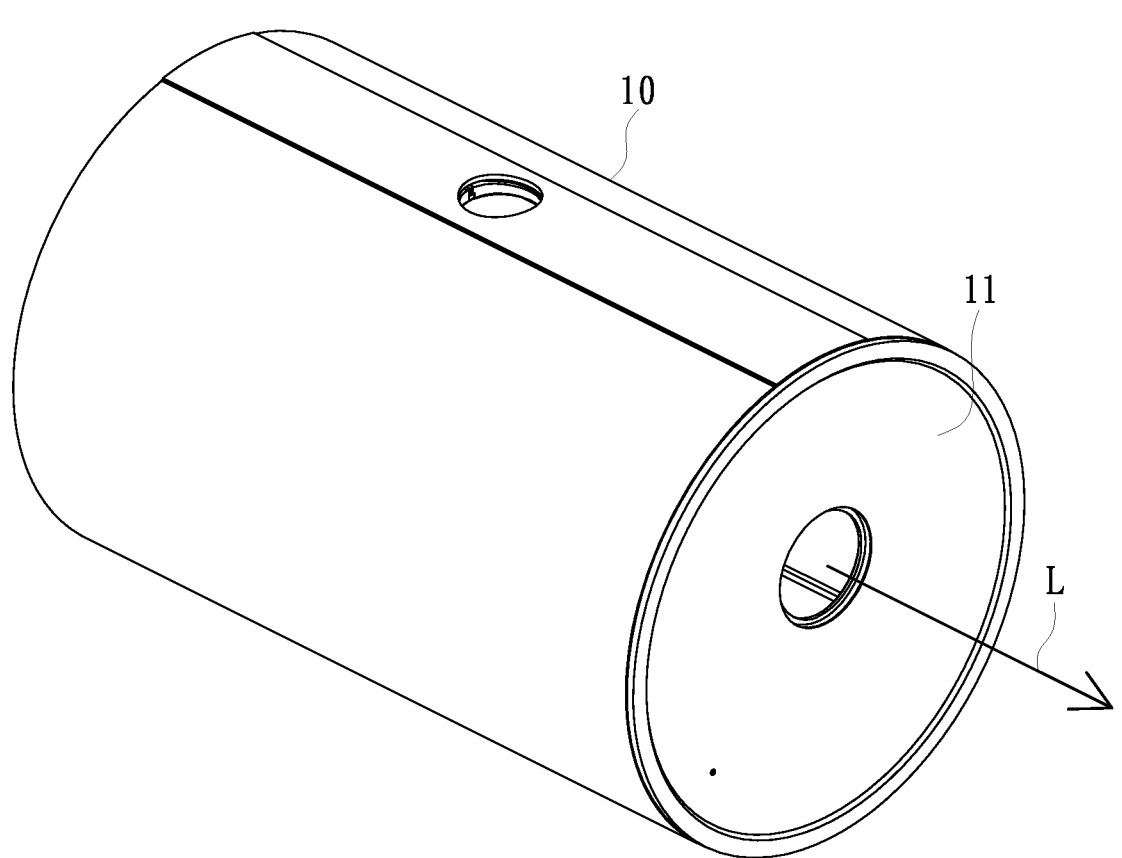
FIG. 1 is a schematic diagram of a projection device according to an embodiment of the present invention.
Figure 2:
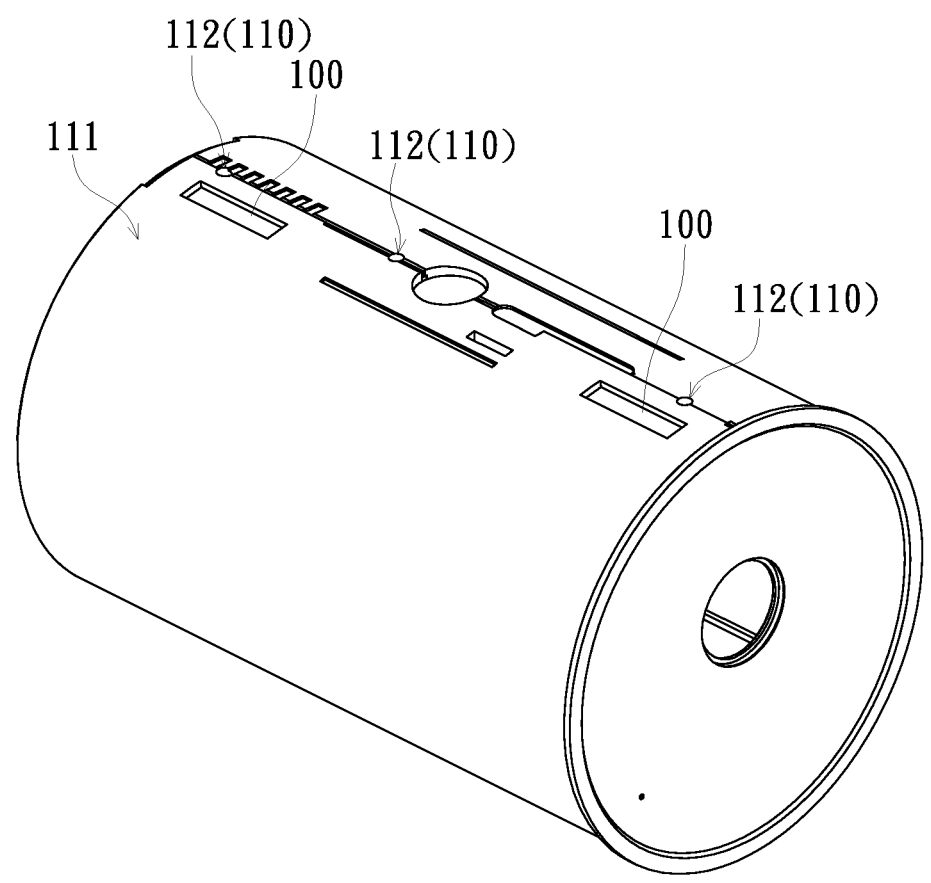
FIG. 2 is a schematic diagram of a projector housing in FIG. 1.

FIG. 1 is a schematic diagram of a projection device according to an embodiment of the present invention. FIG. 2 is a schematic diagram of a projector housing in FIG. 1.

Figure 3:
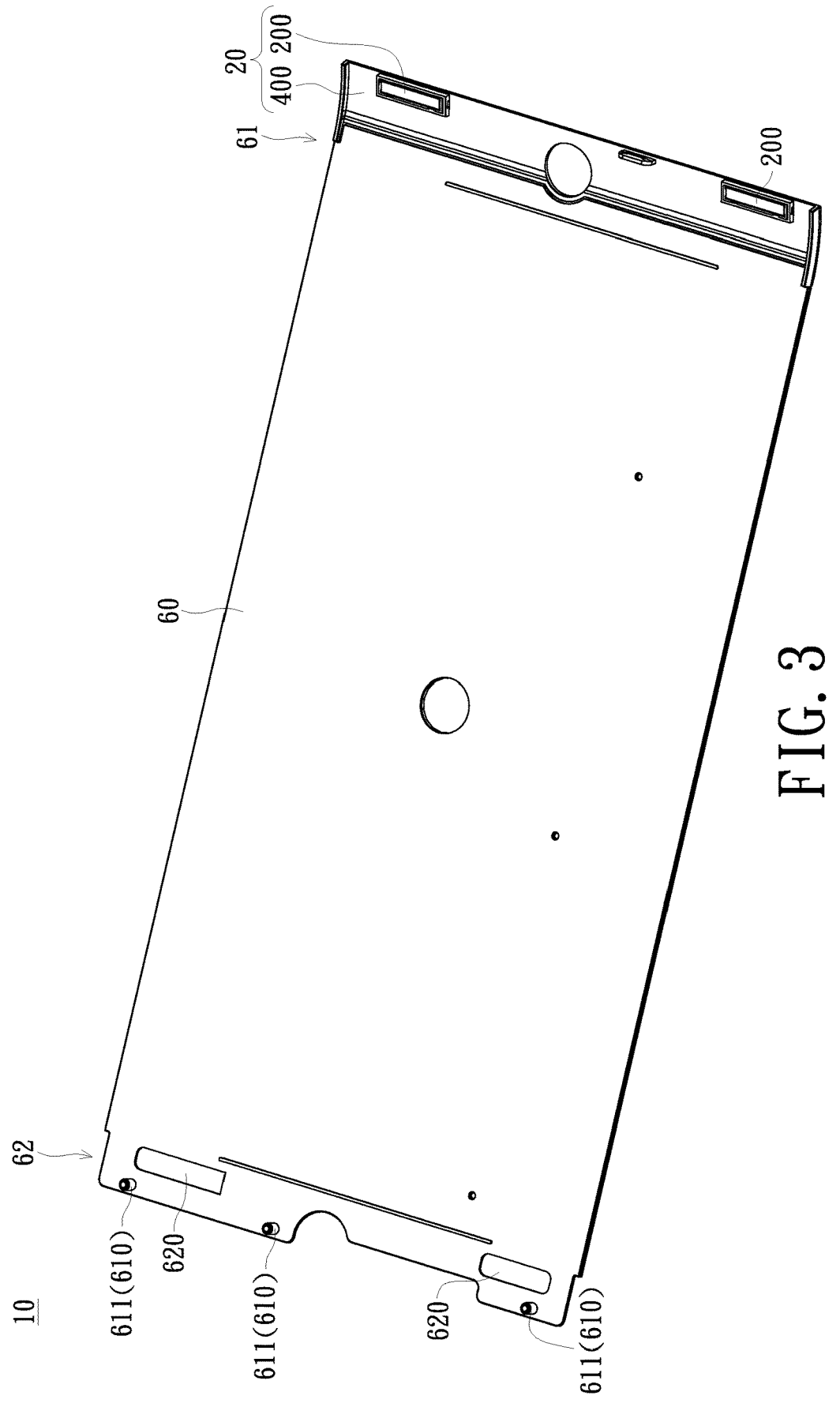
FIG. 3 is a schematic diagram of a protective sleeve in FIG. 1.

FIG. 3 is a schematic diagram of a protective sleeve in FIG. 1. Please refer to FIGS. 1 to 3. The projection device 1 of this embodiment includes a projector housing 11 and a protective sleeve 10. The outer surface 111 of the projector housing 11 is provided with at least one magnetic element 100. The quantity of the magnetic elements 100 is, for example, two in this embodiment, but the invention does not specifically limit the quantity of the magnetic elements 100. The protective sleeve 10 is adapted to cover the projector housing 11. The protective sleeve 10 includes a body 60 and a magnetic attraction module 20. The magnetic attraction module 20 is disposed at the first end 61 of the body 60. The magnetic element 100 in this embodiment is, for example, a magnet or ferromagnetic material, which is suitable for magnetic attachment with the magnetic attraction module 20. In addition, elements such as illumination system, light valve, projection lens and so on are provided inside the projector housing 10 to provide the image beam L that can be projected on the screen. In FIG. 1, the arrow direction of the image beam L represents the projection direction of the image beam L.

The magnetic attraction module 20 includes, for example, at least one magnetic attraction kit 200. In addition, the magnetic attraction module 20 of this embodiment further includes, for example, a connecting part 400 connected to the first end 61 of the body 60. The magnetic attraction kit 200 is disposed, for example, on the connecting part 400. The quantity of the magnetic attraction kits 200 is, for example, two in this embodiment, but the invention does not limit the quantity of the magnetic attraction kits 200. The projector housing 11 in this embodiment is, for example, cylindrical; however, the protective sleeve 10 of the present invention can also be applied to the projector housing 11 of other shapes, such as a cube or a cuboid. In addition, the connecting part 400 is, for example, a plate-shaped base, but the invention is not limited thereto. The projector housing 11 of this embodiment further includes, for example, a first positioning part 110, and the body 60 further includes, for example, a second positioning part 610. The second positioning part 610 is disposed, for example, at the second end 62 of the body 60. The second end 62 of the body 60 is, for example, opposite to the first end 61. The first positioning part 110 is combined with the second positioning part 610. Specifically, the first positioning part 110 includes, for example, a plurality of positioning holes 112, and the second positioning part 610 includes, for example, a plurality of positioning columns 611. The positioning hole 112 is sleeved on the respective positioning column 611 when the protective sleeve 10 covers the projector housing 11. In this embodiment, the quantity of the positioning holes 112 of the first positioning part 110 is, for example, three, and the quantity of the positioning columns 611 of the second positioning part 610 is, for example, three. However, the invention does not limit the quantity of the positioning holes 112 and the positioning columns 611. In addition, the second positioning part 610 can be further disposed at other suitable positions of the body 60, and the first positioning part 110 is accordingly disposed in coordination with the position of the second positioning part 610. It should be noted that the second positioning part 610 is not limited to a columnar structure. For example, the second positioning part 610 can be a semi-circular convex structure or a conical convex structure. That is, a structure that protrudes from the plane of the second end 62 of the body 60 and can be further penetrated into the corresponding positioning hole 112 is suitable for being the second positioning part 610. In another embodiment, the first positioning part 110 can be a positioning column, and the second positioning part 610 can be a positioning hole. In addition, the combination of the first positioning part 110 and the second positioning part 610 in this embodiment is, for example, the combination of the positioning hole 112 and the positioning column 611, but the invention does not specifically limit the combination of the first positioning part 110 and the second positioning part 610. In this embodiment, the protective sleeve 10 can be fixed on the projector housing 11 without sliding by arranging the first positioning part 110 and the second positioning part 610 on the projector housing 11 and the body 60 respectively.

The body 60 of this embodiment includes, for example, at least one opening 620, which is disposed at the second end 62 of the body 60 and exposes the corresponding magnetic element 100. Specifically, in this embodiment, both of the quantity of the openings 620 and the quantity of the magnetic elements 100 are two, for example. It should be noted that the opening 620 exposes the corresponding magnetic element 100 when the protective sleeve 10 covers the projector housing 11 and the second positioning part 610 of the body 60 of the protective sleeve 10 is combined with the first positioning part 110 of the projector housing 11. At this time, the magnetic attraction kit 200 of the body 60 can be magnetically attracted to the corresponding magnetic element 100. With the above structural configuration, the positioning effect of the protective sleeve 10 can be further increased, making the protective sleeve 10 more difficult to slide relative to the projector housing 11. In addition, the design of the opening 620 enables the magnetic element 100 to directly contact with the magnetic attraction kit 200 for attraction when the protective sleeve 10 covers the projector housing 11 and the magnetic element 100 and the magnetic attraction kit 200 are suitable for magnetic attraction, and therefore having better magnetic attraction effect.

Figure 4:
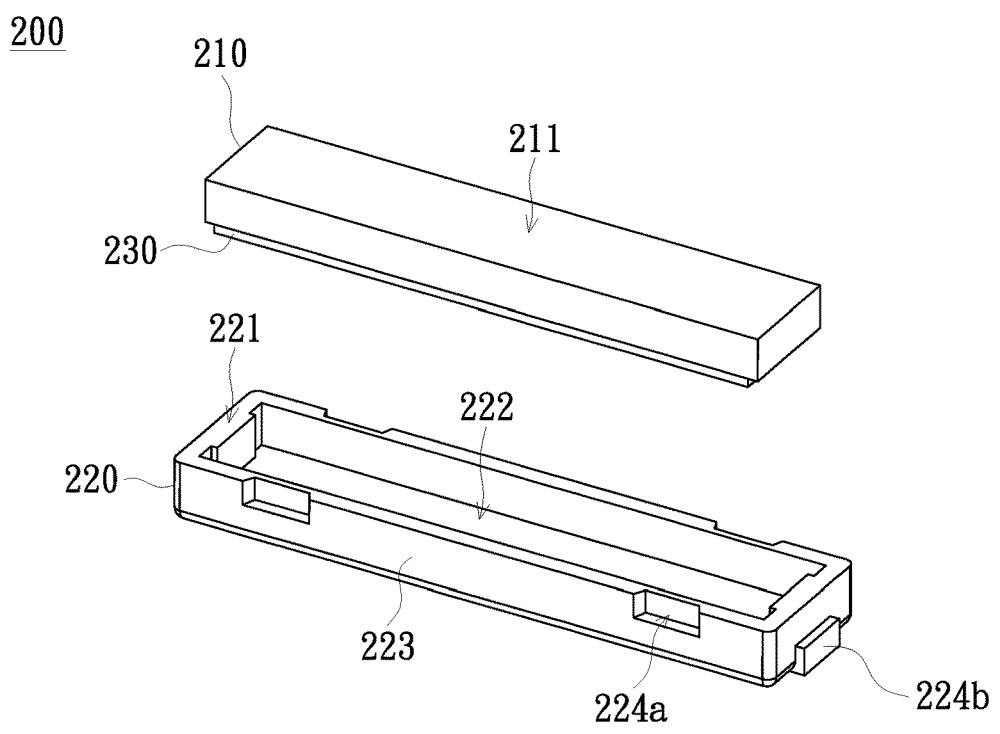
FIG. 4 is a schematic diagram of a magnet and a magnetic conductive housing in an embodiment of the invention.

The magnetic attraction kit 200 will be further described below. FIG. 4 is a schematic diagram of a magnet and a magnetic conductive housing in an embodiment of the invention. Please refer to FIG. 4. The magnetic attraction kit 200 includes, for example, a magnet 210 and a magnetic conductive housing 220. The magnet 210 has a magnetic attraction surface 211, for example, on the side near the projector housing 11 (shown in FIG. 2). The magnetic conductive housing 220 has, for example, an open end surface 221 and an accommodating groove 222 that is recessed from the open end surface 221 in the direction away from the projector housing 11 (shown in FIG. 2). The magnet 210 is disposed, for example, in the accommodating groove 222. In addition, the side wall 223 of each magnetic conductive housing 220 has at least one first fixing structure 224a or 224b, for example. The magnetic conductive housing 220 of this embodiment has, for example, four side walls 223 surrounding the accommodating groove 222, and each side wall 223 is provided with a first fixing structure 224a or 224b. The first fixing structure 224a is, for example, a groove, and the first fixing structure 224b is, for example, a hook. The invention does not specifically limit the quantity of the side walls 223 of the magnetic conductive housing 220 to four and does not limit that each side wall 223 must be provided with the first fixing structure 224a or 224b.

In addition, the magnetic attraction kit 200 further includes, for example, a bonding part 230 disposed between the corresponding magnet 210 and the magnetic conductive housing 220. The bonding part 230 of this embodiment is disposed on the opposite side of the magnetic attraction surface 211 of the magnet 210, for example, so that the magnet 210 can be fixed in the accommodating groove 222 of the magnetic conductive housing 220 through the bonding part 230 to prevent the magnet 210 from falling off from the magnetic conductive housing 220. The bonding part 230 is, for example, double-sided adhesive, but the invention does not specifically limit the type of the bonding part 230.

Figure 5:
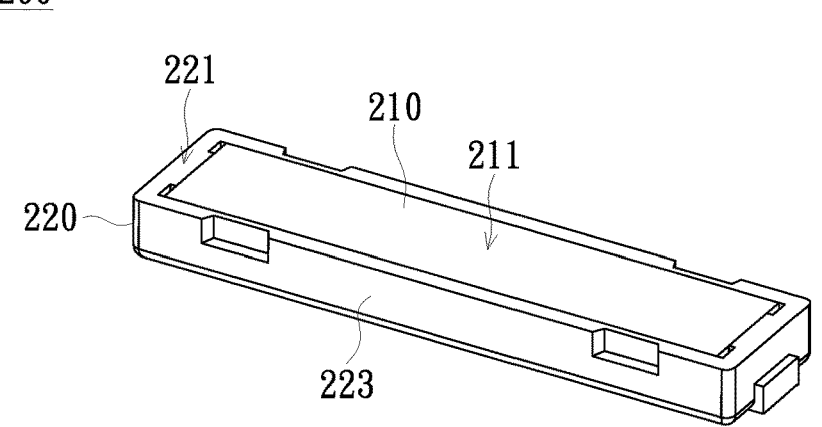
FIG. 5 is a schematic diagram in which the magnet is disposed in the magnetic conductive housing in an embodiment of the invention.

FIG. 5 is a schematic diagram in which the magnet is disposed in the magnetic conductive housing in an embodiment of the invention. Referring to FIG. 5, the open end surface 221 of the magnetic conductive housing 220 is parallel to the magnetic attraction surface 211, for example. The first magnetic pole of the magnet 210 is located on the magnetic attraction surface 211, the magnetic conductive housing 220 guides the second pole of the magnet 210 to the open end surface 221, and the magnetic attraction surface 211 and the open end surface 221 are attached on the corresponding magnetic element 100, for example. Specifically, in this embodiment, the height of the magnet 210 in the direction perpendicular to the magnetic attraction surface 211 is the same as the height of the side wall 223 of the magnetic conductive housing 220 when the magnet 210 is disposed in the accommodating groove 222 (shown in FIG. 4) of the magnetic conductive housing 220, so that the magnetic attraction surface 211 and the open end surface 221 are located in the same reference plane. The magnetic conductive housing 220 is made of magnetic conductive materials, such as carbon steel, etc. Thus, when the magnet 210 is disposed in the accommodating groove 222 (shown in FIG. 4), the magnetic conductive housing 210 will guide the second magnetic pole to the open end surface 221, so that the first magnetic pole and the second magnetic pole are on the same side, and then the magnetic force of the magnet 210 is concentrated on the same side, which can increase the effect of magnetic attraction. On the other hand, the magnetic attraction kit 200 has less magnetic attraction effect on other surfaces except the magnetic attracting surface 211 and the open end surface 221, which can avoid attracting other objects, such as the paper clip.

Although the magnetic attraction surface 211 and the open end surface 221 in this embodiment are located in the same reference plane, the magnetic attraction surface 211 can be slightly higher or lower than the open end surface 221 in another embodiment. The invention does not specifically limit the relative height of the magnetic attraction surface 211 and the open end surface 221. The first magnetic pole of the magnetic attraction surface 211 in this embodiment is, for example, N pole, and the second magnetic pole of the open end surface 221 is, for example, S pole, but the invention is not limited thereto. In another embodiment, the first magnetic pole is, for example, S pole, and the second magnetic pole is, for example, N pole.

Figure 6:
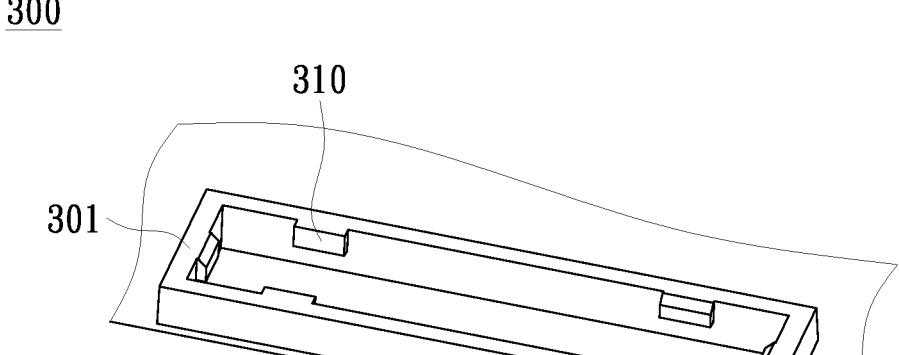
FIG. 6 is a schematic diagram of a fixing part of an embodiment of the present invention.
Figure 7:
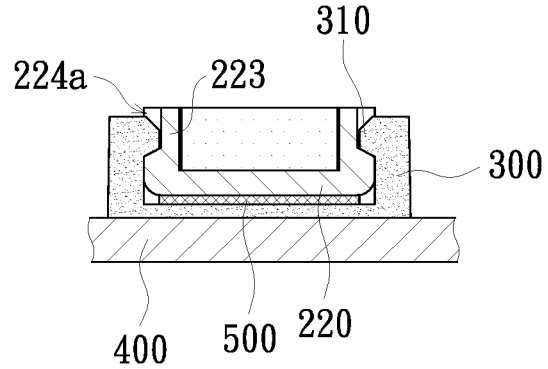
FIG. 7 is a sectional diagram in which a magnetic attraction kit is disposed on the fixing part in an embodiment of the invention.

FIG. 6 is a schematic diagram of a fixing part of an embodiment of the present invention. FIG. 7 is a sectional diagram in which a magnetic attraction kit is disposed on the fixing part in an embodiment of the invention. Please refer to FIGS. 4, 6 and 7. The magnetic attraction module 20 (shown in FIG. 3) further includes, for example, at least one fixing part 300. The inner wall 301 of each fixing part 300 has, for example, at least one second fixing structure 310. Each magnetic conductive housing 220 is, for example, is disposed on the corresponding fixing part 300. Each first fixing structure 224a and 224b, for example, combines with the corresponding second fixing structure 310. The second fixing structure 310 is, for example, a hook, and the second fixing structure 310 is, for example, clamped to the corresponding first fixing structures 224a and 224b. For example, the combination of the first fixing structure 224a and the second fixing structure 310 is the combination of the groove and the hook, and the combination of the first fixing structure 224*b* and the second fixing structure 310 is the combination of the lower hook and the upper hook. In another embodiment of the invention, the first fixing structure 224*a* can be a hook, and the first fixing structure 224*b* can be a groove, so that the first fixing structure 224*a* and 224*b* can be combined with the hook of the second fixing structure 310, respectively. In still another embodiment, the first fixing structures 224*a* and 224*b* can be hooks, and the second fixing structure 310 can be a groove. The fixing part 300 of this embodiment has, for example, four inner walls 301, and each inner wall 301 is provided with, for example, one or two second fixing structures 310. The magnetic conductive housing 220 is disposed in the fixing part 300, for example. The magnetic conductive housing 220 is fixed in the fixing part 300 by combining the first fixing structures 224*a* and 224*b* with the corresponding second fixing structures 310. Therefore, the design of the first fixing structures 224*a* and 224*b* and the second fixing structure 310 can make the magnetic attraction kit 200 firmly fixed on the fixing part 300. It should be noted that the invention does not limit the specific quantity of the inner walls 301 of the fixing part 300. For example, the quantity of the inner walls 301 of the fixing part 300 can be three or two disposed oppositely.

In addition, the magnet 210 is disposed in the magnetic conductive housing 220, and the magnetic conductive housing 220 is disposed in the fixing part 300. To sum up, the magnet 210 of this embodiment can be firmly fixed in the fixing part 300 by the combination of the first fixing structure 224*a* and 224*b* and the second fixing structure 310 to prevent the magnet 210 from loosening from the protective sleeve 10. The combination of the first fixing structures 224*a* and 224*b* and the second fixing structure 310 in this embodiment is, for example, clamping, but the invention is not limited thereto. The inner wall 301 of the fixing part 300 in this embodiment is provided with more than one second fixing structure 310. However, the invention does not limit that each inner wall 301 of the fixing part 300 needs to be provided with a second fixing structure 310. However, for each fixing part 300, at least one second fixing structure 310 is provided on at least two inner walls 301 to achieve better fixing effect.

The magnetic attraction module 20 (shown in FIG. 3) of this embodiment further includes, for example, at least one buffer 500 disposed between the corresponding fixing part 300 and the magnetic conductive housing 220. Please refer to FIG. 7. Specifically, in this embodiment, the buffer 500 is disposed at the junction of the magnetic conductive housing 220 and the fixing part 300, for example. The buffer 500 is, for example, a foam tape used to remove the assembly gap between the magnetic conductive housing 220 and the fixing part 300, strengthen the magnetic conductive housing 220 with thin shell and flexibility, and reduce the vibration noise of the projection device 1 (shown in FIG. 1). In addition, the buffer 500 is, for example, a foam tape with adhesive properties, which can increase the effect of fixing the magnetic conductive housing 220 to the fixing part 300.

Please refer to FIGS. 3 and 7. The fixing part 300 of this embodiment is disposed, for example, on the connecting part 400, and the magnetic attraction kit 200 is fixed on the fixing part 300 by the first fixing structure 224*a*, 224*b* and the second fixing structure 310; that is, the magnetic attraction kit 200 is fixed on the body 60 by the connecting part 400. The fixing part 300 and the connecting part 400 can be integrally formed. For example, the fixing part 300 and the connecting part 400 can be made by plastic injection molding. In addition, the fixing part 300 and the connecting part

400 can be two independent components, and the invention does not specifically limit the way in which the fixing part 300 is connected to the connecting part 400. In addition, the invention does not specifically limit the way in which the connecting part 400 is connected to the body 60.

Figure 8:
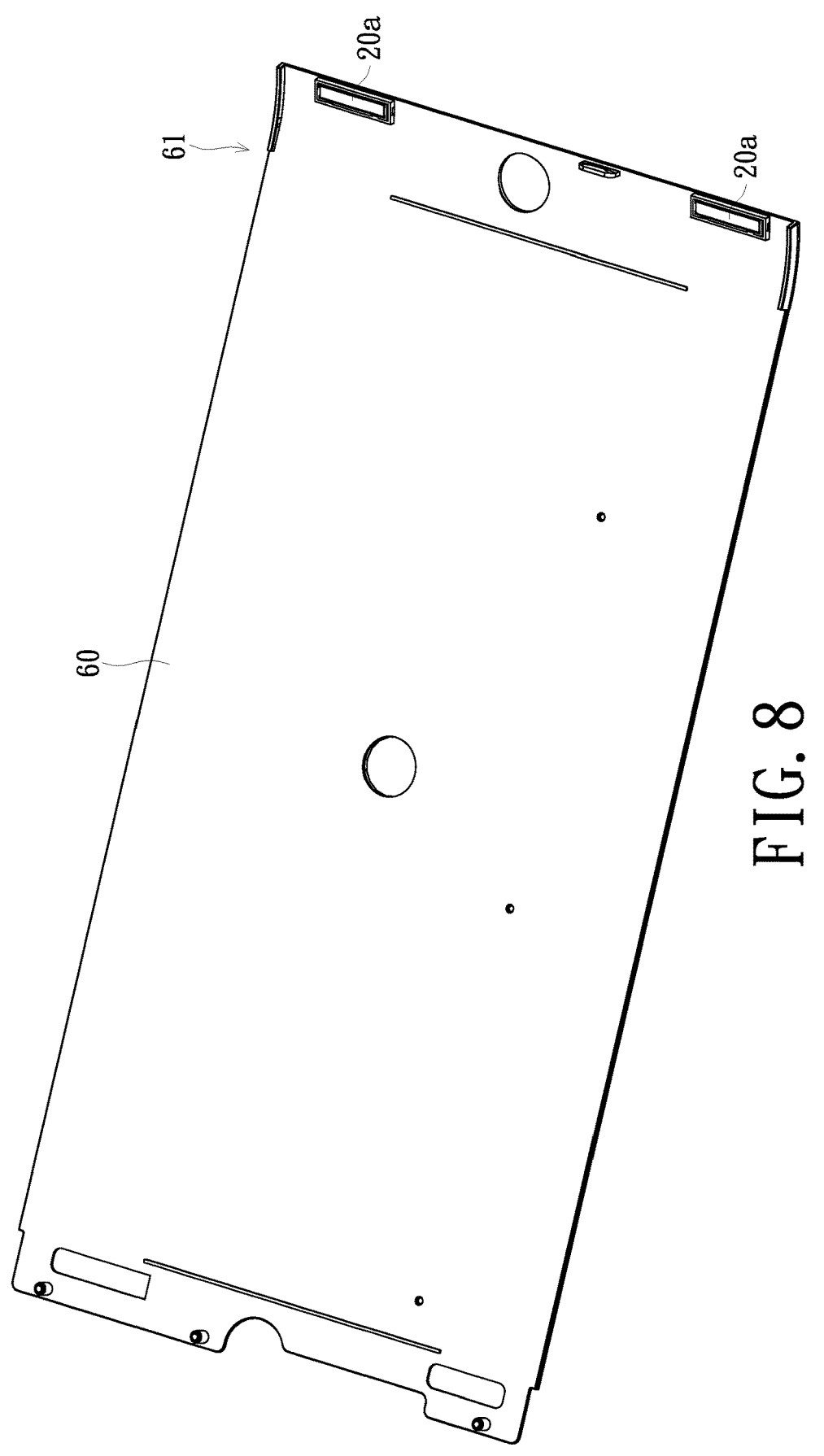
FIG. 8 is a schematic diagram of a protective sleeve of another embodiment of the invention.

FIG. 8 is a schematic diagram of a protective sleeve of another embodiment of the invention. Please refer to FIGS. 3 and 8. The protective sleeve 10*a* of this embodiment is similar to the protective sleeve 10 of FIG. 3, and the main difference is that the magnetic attraction module 20*a* of this embodiment does not have a connecting part 400, for example. In other words, the fixing part 300 can be directly installed on the first end 61 of the body 60 without connecting through the connecting part 400, but the invention is not limited thereto. In one embodiment, the body 60 and the fixing part 300 are integrally formed, for example.

In summary, the invention adopts the magnetic element disposed on the outer surface of the projector housing to magnetically attract the magnetic attraction kit on the protective sleeve, which makes the protective sleeve easy to assemble and disassemble. In addition, the invention uses the method of mutual engagement of the first and second fixing structures to firmly fix the magnet to the protective sleeve, making it difficult for the magnet to loosen from the protective sleeve when assembling and disassembling the protective sleeve, and increasing the reliability of the protective sleeve. It is to be noted that, in the invention, the magnet is disposed in the magnetic conductive housing that can guide the magnetic force, so that the first magnetic pole and the second magnetic pole of the magnet are limited to the same side, so as to prevent the protective sleeve from attracting other objects on the other side of fixing the magnet.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first end, the second end, the first magnetic pole, the second magnetic pole, the first fixing structure, the second fixing structure, the first positioning part and the second positioning part are only used for distinguishing various elements and do not limit the number of the elements.

What is claimed is:

1. A projection device, comprising:
   a projector housing, wherein at least one magnetic element is disposed on an outer surface of the projector housing; and
   a protective sleeve, adapted to cover the projector housing, wherein the protective sleeve comprises a body and a magnetic attraction module, and the magnetic attraction module is disposed at a first end of the body, wherein the magnetic attraction module comprises at least one magnetic attraction kit, and each of the at least one magnetic attraction kit comprises:
   a magnet, having a magnetic attraction surface on a side of the magnet near the projector housing; and
   a magnetic conductive shell, having an open end surface and an accommodating groove that is recessed from the open end surface in a direction away from the projector housing, wherein the magnet is disposed in the accommodating groove, the open end surface is parallel to the magnetic attraction surface, a first magnetic pole of the magnet is located on the magnetic attraction surface, the magnetic conductive shell guides a second magnetic pole of the magnet to the open end surface, and the magnetic attraction surface and the open end surface are attached on corresponding one of the at least one magnetic element.

2. The projection device according to claim 1, wherein a side wall of each of the at least one magnetic conductive shell has at least one first fixing structure, the magnetic attraction module further comprises at least one fixing part, an inner wall of each of the at least one fixing part has at least one second fixing structure, each of the at least one magnetic conductive shell is disposed at corresponding one of the at least one fixing part, and each of the at least one first fixing structure is combined with corresponding one of the at least one second fixing structure.

3. The projection device according to claim 2, wherein each of the at least one second fixing structure is clamped to corresponding one of the at least one first fixing structure.

4. The projection device according to claim 2, wherein the magnetic attraction module further comprises a connecting part, the connecting part is connected to the body, and the at least one fixing part is disposed on the connecting part.

5. The projection device according to claim 2, wherein the magnetic attraction module further comprises at least one buffer, each of the at least one buffer is disposed between corresponding one of the at least one fixing part and one of the at least one magnetic conductive housing.

6. The projection device according to claim 1, wherein each of the at least one magnetic attraction kit further comprises a bonding part, and the at least one bonding part is disposed between corresponding one of the at least one magnet and one of the at least one magnetic conductive housing.

7. The projection device according to claim 1, wherein the projector housing further comprises a first positioning part, the body further comprises a second positioning part, the second positioning part is disposed at a second end of the body, the second end of the body is opposite to the first end, and the first positioning part is combined with the second positioning part.

8. The projection device according to claim 7, wherein the first positioning part comprises a plurality of positioning holes, the second positioning part comprises a plurality of positioning columns, and the positioning holes are sleeved on the positioning columns respectively.

9. The projection device according to claim 1, wherein the body further comprises at least one opening, the at least one opening is disposed at a second end of the body, the second end of the body is opposite to the first end, and each of the at least one opening exposes corresponding one of the at least one magnetic element.

* * * * *